United States Patent [19]

Kassai

[11] 4,272,100
[45] Jun. 9, 1981

[54] COLLAPSIBLE BABY CARRIAGE

[75] Inventor: Kenzou Kassai, Osaka, Japan

[73] Assignee: Kassai Kabushikikaisha, Osaka, Japan

[21] Appl. No.: 43,337

[22] Filed: May 29, 1979

[30] Foreign Application Priority Data

Aug. 29, 1978 [JP] Japan ................................ 53/106756
Dec. 15, 1978 [JP] Japan ................................ 53/155284
Dec. 16, 1978 [JP] Japan ................................ 53/155537

[51] Int. Cl.³ ............................................. B62B 7/02
[52] U.S. Cl. ................................... 280/650; 280/47.4
[58] Field of Search ................ 280/42, 647, 650, 642, 280/47.25, 47.38, 47.4; 296/1 B

[56] References Cited

U.S. PATENT DOCUMENTS

| 3,968,991 | 7/1976 | Maclaren | 280/42 |
| 3,976,309 | 8/1976 | Montanelli | 280/42 X |
| 4,077,640 | 3/1978 | Perego | 280/42 |
| 4,077,641 | 3/1978 | Perego | 280/42 |
| 4,191,397 | 3/1980 | Kassai | 280/647 |

Primary Examiner—David M. Mitchell
Assistant Examiner—Norman L. Stack, Jr.
Attorney, Agent, or Firm—W. G. Fasse; D. F. Gould

[57] ABSTRACT

A collapsible baby carriage has a main framework including a pair of right and left main rods, a pair of right and left auxiliary rods pivotally connected to the intermediate portions of the main rods, and a plurality of sets of bendable connecting rods installed between the pair of main rods and between the pair of auxiliary rods. The main rods are disposed to extend from the rear upper region to the front lower region, with their upper portions serving as push rods and their lower portions serving as front legs. The auxiliary rods extend rearwardly downwardly from their respective pivots to serve as rear legs. Of the plurality of sets of connecting rods, the sets provided for the main rods are connected to first rods which transmit their bending motion, whereby the spacing between the main rods is changed. This spacing changing motion is operatively effected through second and third rods with the rotation of the auxiliary rods relative to the main rods and with the motion for changing the spacing between the auxiliary rods. With this arrangement, a vertically extending elongated collapsed state can be obtained.

48 Claims, 29 Drawing Figures

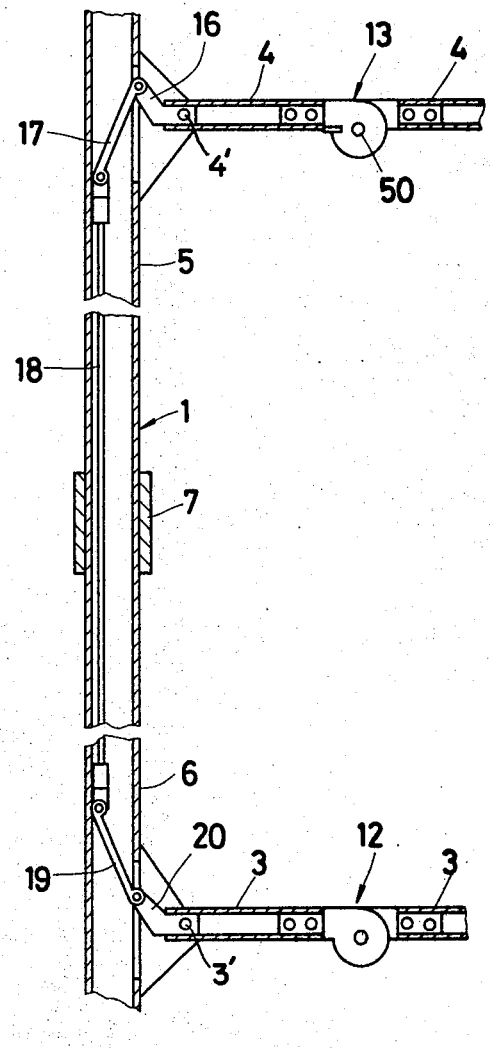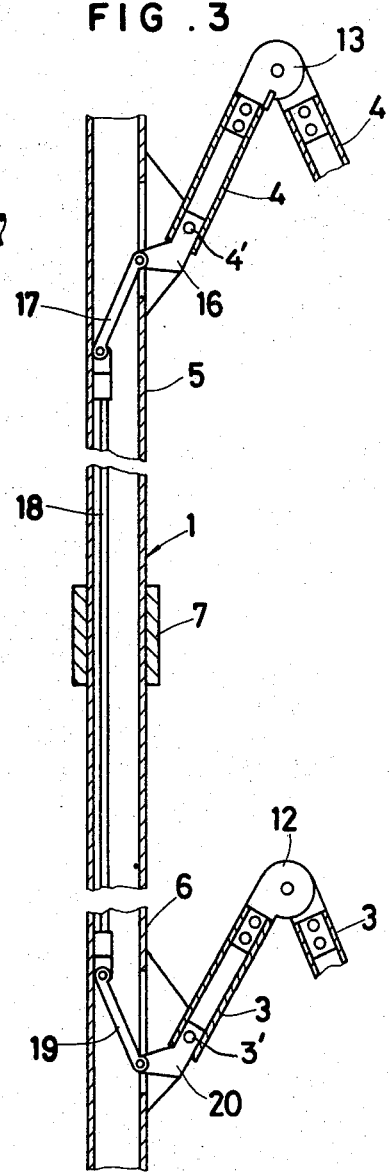

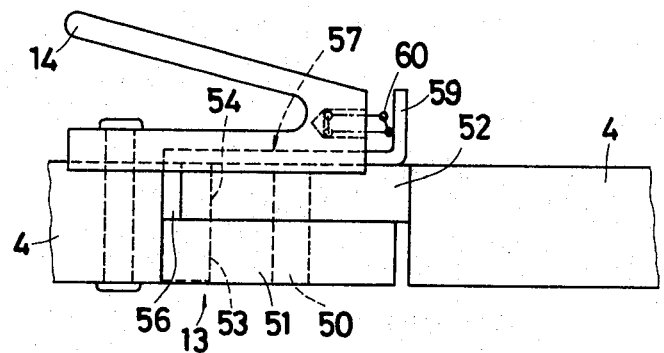
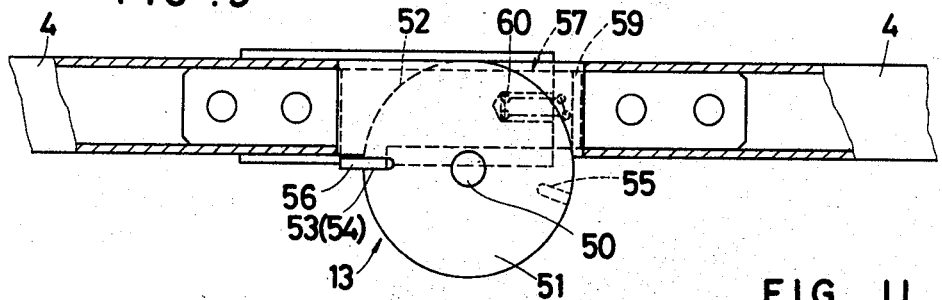
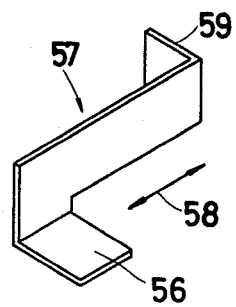
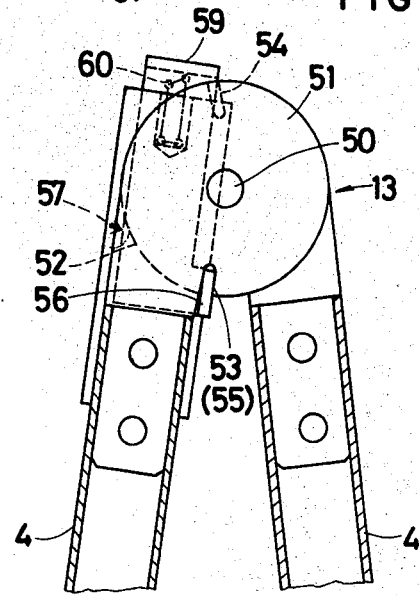

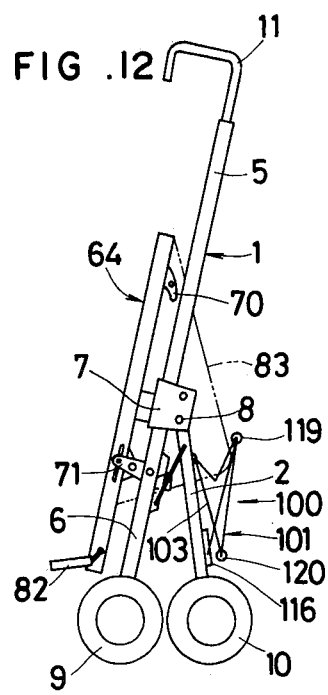
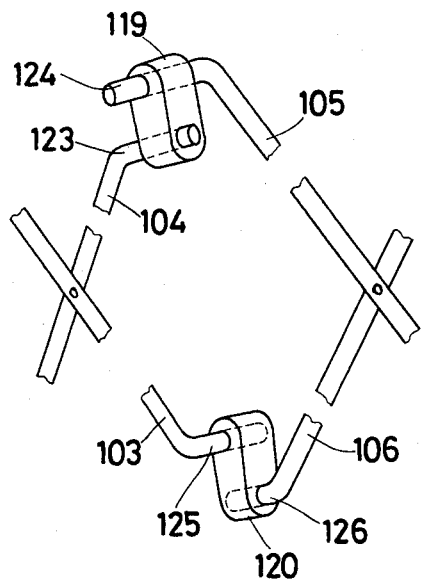
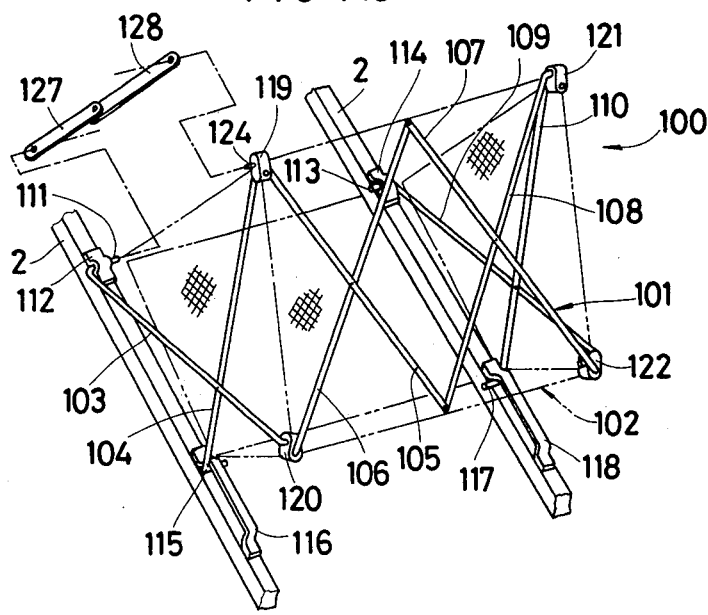

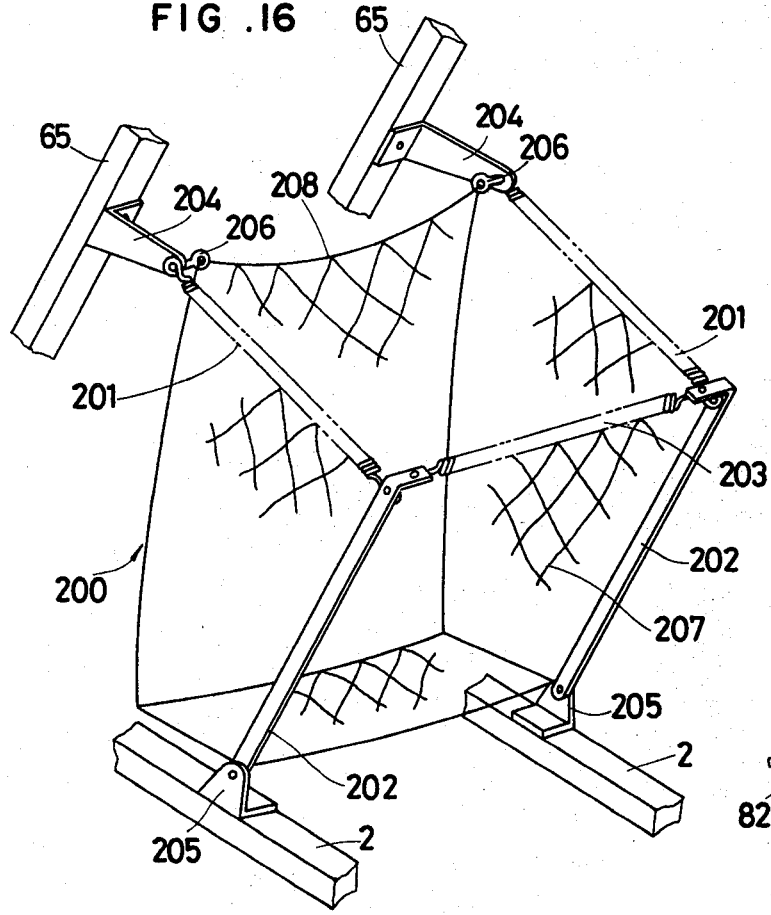
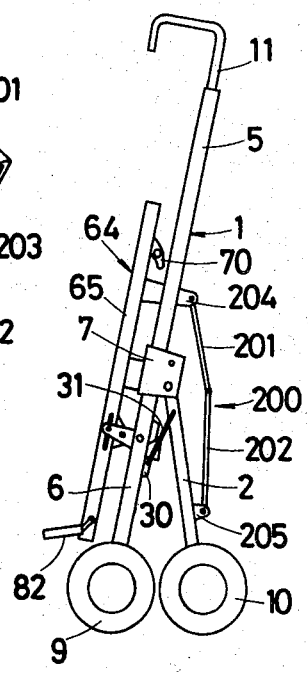
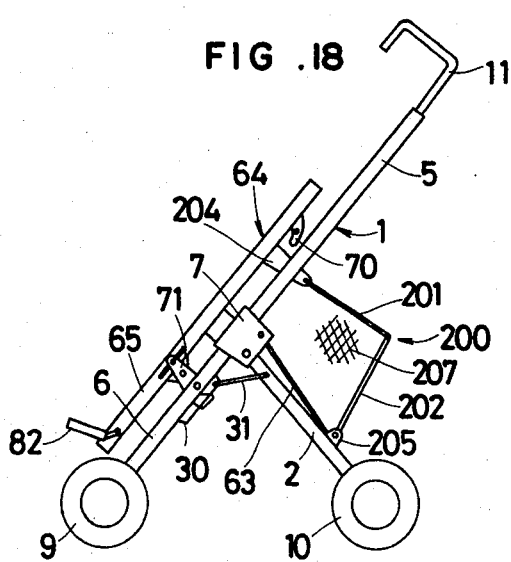
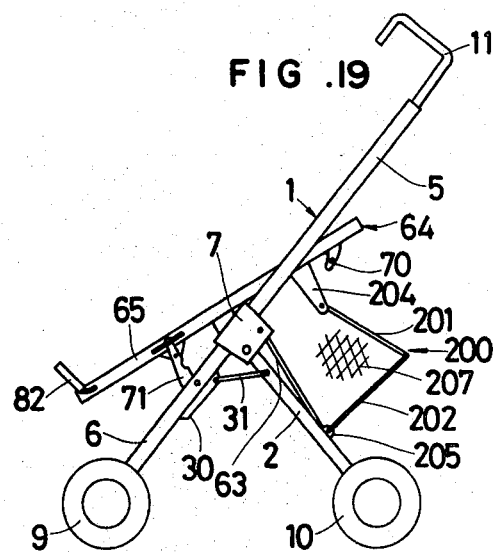

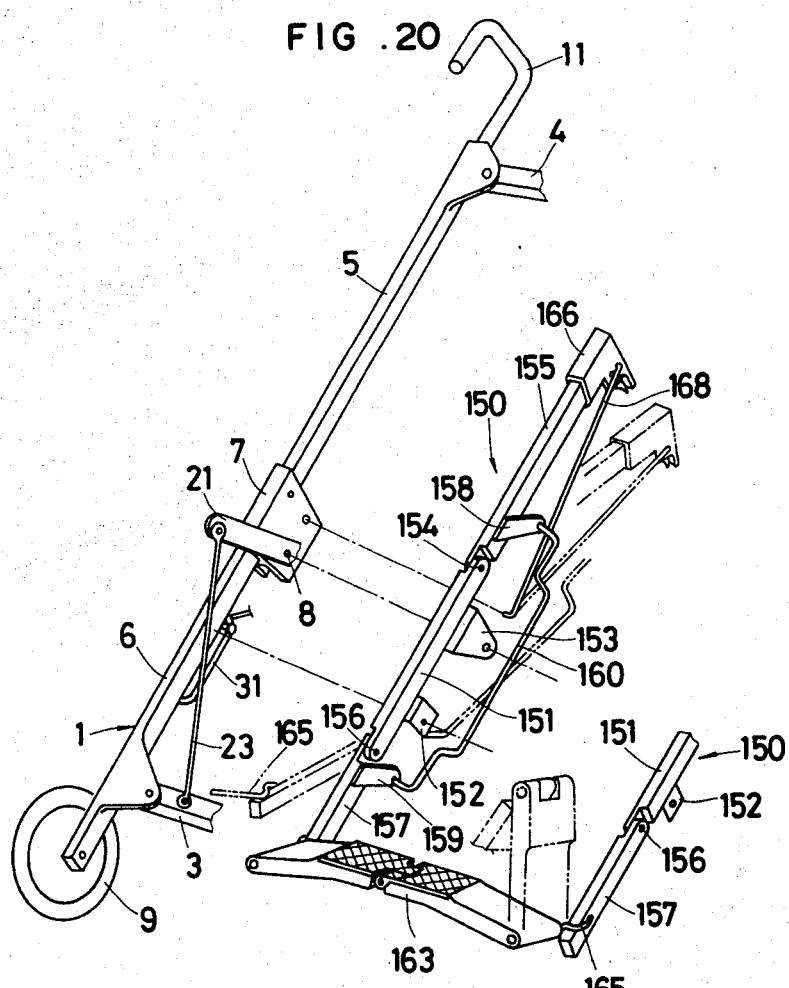
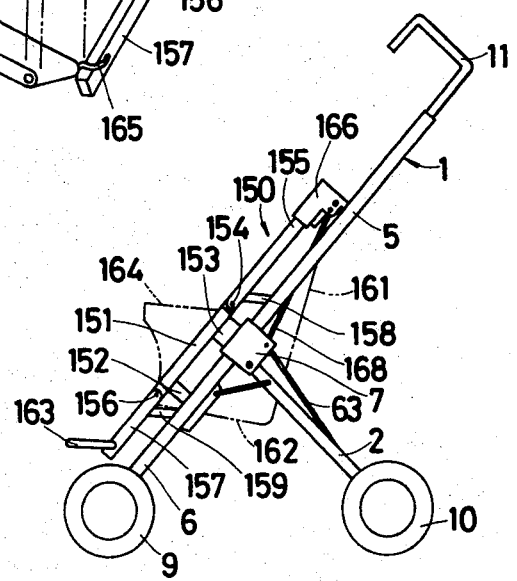

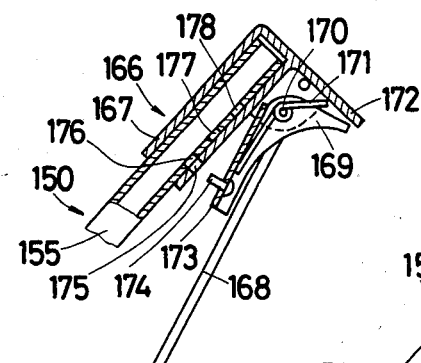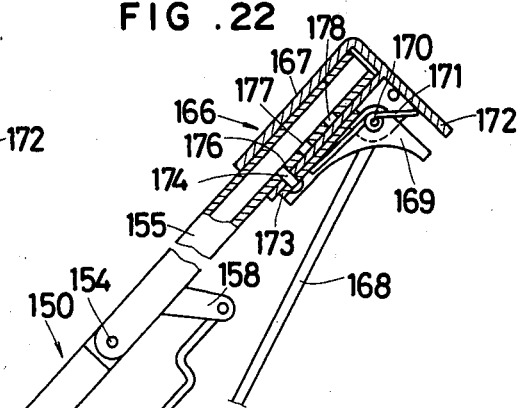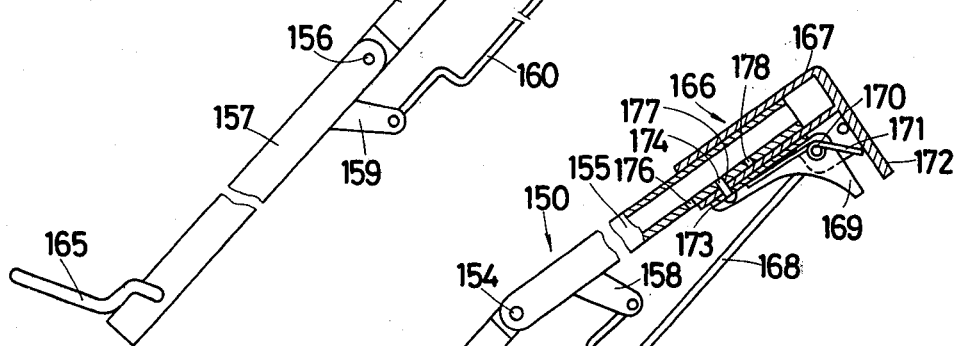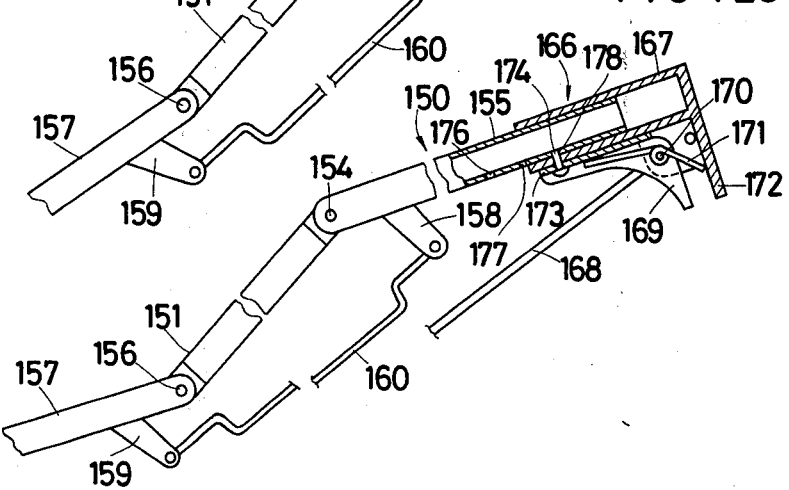

COLLAPSIBLE BABY CARRIAGE

BACKGROUND OF THE INVENTION

1. Field of the Invention

This invention relates to a collapsible baby carriage, and more particularly it relates to improvements in the collapsing mechanism thereof.

2. Description of the Prior Art

Generally, a collapsible baby carriage is very convenient in connection with the use of transport facilities and has been widely used. Among the performance requirements of a collapsible baby carriage are the following;

(1) Safety;
(2) The posture of the baby rested in the baby carriage should be satisfactory from a medical viewpoint;
(3) The collapsing operation should be easy;
(4) Light in weight and handy to carry;
(5) Simple construction;
(6) Sufficient strength and durability;
(7) Reclining function;
(8) The collapsing handle should be within easy reach;
(9) The opening and/or closing of the legs should require only a single manual action;
(10) The provision of a basket for containing baggage therein;
(11) The basket should be designed to be collapsed in response to the collapsing of the baby carriage;
(12) The loading and unloading opening provided in the basket should always be positioned to facilitate loading and unloading; and
(13) In the case of a hammock having a back, a seat and a footrest, the arrangement should be such that the back can be reclined while maintaining the seat at a fixed angle of inclination and that when the back is reclined, the position of the footrest relative to the seat should be changed, thereby assuring a comfortable posture for the baby at all times.

SUMMARY OF THE INVENTION

This invention is intended to provide a baby carriage which is capable of meeting these various requirements.

This invention relates to a collapsible baby carriage comprising a pair of right and left main rods spaced apart from each other, each composed of a single bar, a pair of right and left auxiliary rods spaced from each other and pivotally connected to the intermediate portions of said main rods, a plurality of sets of bendable connecting rods installed between the pair of main rods and disposed at a plurality of positions distributed in the direction of the length of the main rods, first link means for operative association between the bending motions of the plurality of sets of connecting rods, and second link means for rotating the auxiliary rods relative to the main rods to produce a motion for changing the spacing between the auxiliary rods in response to the motion for changing the spacing between the pair of main rods. The upper portions of the main rods serve as push rods which are to be handled with the hands of a person who pushes the baby carriage, while the lower portions thereof serve as front legs. The front legs have front wheels rotatably mounted on the lower ends thereof. The auxiliary rods, which serve as rear legs, have rear wheels rotatably mounted on the lower ends thereof. Further, a hammock for resting a baby therein is positioned between the pair of main rods. As for the leg closing operation in such collapsible baby carriage, the bending of a certain set of connecting rods is attended by the bending of the other sets of connecting rods which takes place through the first link means, and hence the spacing between the pair of main rods is reduced, in operative association with which the angle between the auxiliary rods is changed through the second link means in such a manner as to cause the auxiliary rods to approach the front leg portions of the main rods while the spacing between the pair of auxiliary rods is reduced. Ultimately, a vertically extending elongated collapsed state of the baby carriage is obtained. As for the leg opening operation in this baby carriage, the straightening of a certain set of connecting rods is attended by the straightening of the other sets of connecting rods which takes place through the first link means, and hence the spacing between the pair of main rods is increased, whereby the angle between the auxiliary rods is changed through the second link means in such a manner as to cause the auxiliary rods to move away from the front leg portions of the main rods while the spacing between the pair of auxiliary rods is increased, whereby a leg-opened state of the baby carriage is obtained in which the main rods extend from the rear upper region to the front lower region while the auxiliary rods extend rearwardly downwardly from the central regions of the main rods.

In a preferred embodiment of the invention, said first link means includes first rods. The main rods are each composed of a hollow bar, and the first rods are inserted in the main rods. The first rods are adapted to be actuated longitudinally of the main rods and this motion induces the motion of the plurality of sets of connecting rods. Locking means are provided for inhibiting the bending motion of at least one set of connecting rods.

In another preferred embodiment of the invention, the second link means includes second and third rods. Of the plurality of sets of connecting rods, at least one set is installed between the pair of auxiliary rods and arranged to be upwardly bendable. The second link means further include bendable connecting rods installed between the pair of auxilairy rods. Thus, the second rods control the motion for changing the cross angle of the auxiliary rods with respect to the main rods in operative association with the bending motion of the connecting rods installed between the front leg portions. The third rods control the bending motion of the connecting rods installed between the auxiliary rods in operative association with the motion for changing the cross angle of the auxiliary rods with respect to the main rods.

In another preferred embodiment of the invention, said connecting rods installed between the auxiliary rods and said third rods are replaced by intermediary link means comprising transversely extending long rods X-wise crossing each other and pivotally connected together and transversely extending short rods pivotally connected at one of their respective ends to a respective end of said transversely extending long rods. The four operating ends of said intermediary link means are connected to the front leg portions of the main rods and to the auxiliary rods.

In another preferred embodiment of the invention, at least the back of the hammock is designed to be reclinable. More preferably, the seat of the hammock is fixedly installed, while the position of the footrest is changed as the tilted state of the back is changed.

In another embodiment of the invention, there is installed a basket for holding baggage, said basket being adapted to be advantageously collapsed in operative association with the collapsing motion of the baby carriage. More perferably, the members which hold the reclinable back of the hammock are utilized to install the basket relatively rearwardly of said back. With this arrangement, the basket can be suitably deformed in response to the change of the tilted state of the back. Such deformation serves the function of bringing the loading and unloading opening in the basket to a selected position which facilitates the loading and unloading operation.

Accordingly, a principal object of the invention is to provide a collapsible baby carriage which can be collapsed into a compact form, or stated more concretely, into a elongaged form.

Another object of the invention is to provide a collapsible baby carriage which is easy to collapse.

In another aspect of the invention, it provides a collapsible baby carriage provided with a reclinable hammock.

In a further aspect of the invention, it provides a collapsible baby carriage constructed so that as the tilted state of the back of the hammock is changed, the footrest is brought to a suitable position.

In another aspect of the invention, it provides a collapsible baby carriage with a baggage basket which can be advantageously collapsed in response to the collapsing of the baby carriage.

In another aspect of the invention, it provides a collapsible baby carriage constructed so that the loading and unloading opening in the basket can be brought to a selected position convenient for loading and unloading irrespective of the reclined state of the hammock.

These and other objects and features of the invention will become more apparent from the following detailed description given with reference to the accompanying drawings.

BRIEF DESCRIPTION OF THE DRAWINGS

FIGS. 2 and 3 are fragmentary longitudinal sections for explanation of the operation of a collapsing mechanism for the collapsible baby carriage of FIG. 1, illustrating an interlocking mechanism extending from the push rod connecting rod to a front leg connecting rod shown in FIG. 1;

FIG. 8 is a view for explanation of locking means used in connection with the push rod connecting rods of the collapsible baby carriage of FIG. 1, the view being taken from above in the vicinity of an upper connector for the push rod connecting rods;

FIG. 9 is a view of a portion similar to that shown in FIG. 8, the view being taken from the front of the baby carriage;

FIG. 10 is a perspective view of a locking member included in the portion shown in FIGS. 8 and 9;

FIG. 11 shows a locked state established at the most bent state in contrast to the most straightened state shown in FIG. 9;

FIG. 12 is a complete side view for explanation of another embodiment of the invention, schematically illustrating the leg-closed state of a collapsible baby carriage;

FIG. 13 is a perspective view illustrating the arrangement of a basket provided on the collapsible baby carriage of FIG. 12;

FIG. 14 is an enlarged view illustrating a principal portion of FIG. 13;

FIG. 15 is a diagrammatic view of the basket which is in the state shown in FIG. 12, the view being taken from the rear;

FIG. 16 is a fragmentary enlarged perspective view of a basket attached to a collapsible baby carriage according to another embodiment of the invention;

FIG. 17 is a complete side view, schematically illustrating the leg-closed state of the collapsible baby carriage with the basket of FIG. 16 attached thereto;

FIG. 18 is a complete side view, schematically illustrating the leg-opened state of the collapsible baby carriage of FIG. 17;

FIG. 19 is a complete side view, schematically illustrating a state in which the hammock is further reclined as compared with the state shown in FIG. 18;

FIG. 20 is a perspective view of a principal portion for explanation of a further embodiment of the invention, with a certain portion shown exploded, particularly illustrating the manner of attachment of a hammock;

FIG. 21 shows a side view of the carriage with arm rests;

FIGS. 22, 23, 24 and 25 are partly sectioned enlarged views for explanation of the operation of the hammock retaining lateral rod of FIG. 20, the views being shown in comparison with each other;

DESCRIPTION OF THE PREFERRED EMBODIMENTS

FIGS. 1 through 11 illustrate an embodiment of the invention.

Figure 1:
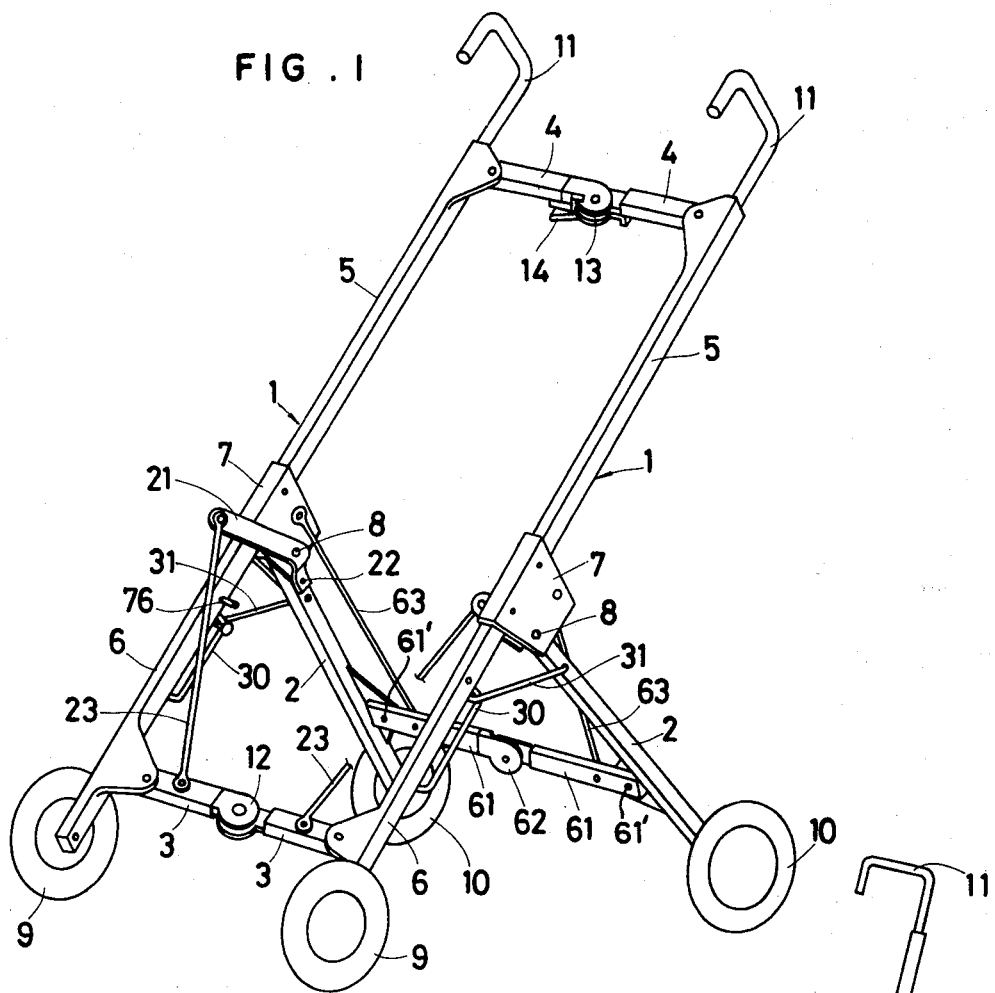
FIG. 1 is a complete perspective view illustrating the leg-opened state of a collapsible baby carriage for explanation of an embodiment of the invention, the arrangement associated with the hammock being omitted from the illustration.

Referring particularly to FIG. 1, the main framework of this baby carriage comprises a pair of right and left main rods 1 extending from the rear upper region to the front lower region, a pair of right and left auxiliary rods 2 pivotally connected to the intermediate portions of the main rods 1 and extending to the rear lower rigion, and a plurality of bendable or rather foldable cross connecting rods 3, 4 and 61 installed between the pair of main rods 1 and between the pair of auxiliary rods 2. The cross-connecting rods 61 are journalled to the auxiliary rods 2 at 61'. Each of these members is formed, e.g. as a hollow bar. The main rods 1 serve to provide push rods 5 at their upper portions and front legs 6 at their lower portions. The auxiliary rods 2 serve as rear legs. The rear legs 2 are pivotally mounted on pivot pins 8 received in pivot mounts 7 secured to the intermediate portions of the main rods 1. The relation between the main rods 1, pivot pins 7 and rear legs 2 is best shown in FIG. 6.

Figure 6:
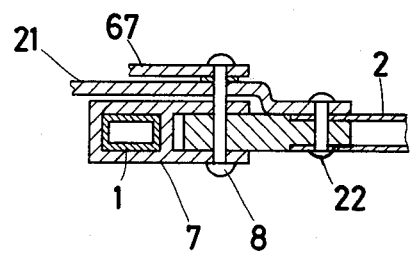
FIG. 6 is an enlarged section for explanation of the arrangement disposed adjacent a pivot of the collapsible baby carriage of FIG. 1.

Referring to FIG. 6, the pivot mount 7 surrounds the main rod 1 and fixed to the latter. The rear leg 2, held in the pivot mount 7, is pivotally mounted on the pivot pin 8.

Referring again mainly to FIG. 1, front wheels 9 are mounted on the lower ends of the front legs 6 and rear wheels 10 are mounted on the lower ends of the rear legs 2. Bent handles 11 are provided at the upper ends of the push rods 5. The above mentioned front leg connecting rods 3 installed between the two front legs 6 are connected by a front connector 12 which is bendable or foldable upwardly. The rear leg connecting rods 61 installed between the two rear legs 2 are connected by a rear connector 62 which is upwardly bendable. The push rod connecting rods 4 installed between the two push rods 5 are connected by an upper connector 13 which is upwardly bendable. An operating knob 14 associated with said upper connector 13 is arranged so that when it is pulled up by hand, the push rod connecting rods 4 can be upwardly bent, as will be later described in more detail.

Referring to FIGS. 2 and 3, at the pivot or journal point 4', where each push rod cross-connecting rod 4 is pivoted to the associated push rod 5, there is a lever 16 adapted to be rotated integrally with the push rod cross-connecting rod 4 about journal means 4'. Pivotally connected to the front end of the lever 16 is one end of a connecting rod 17 whose other end is pivotally connected to a first rod 18. The first rod 18 is inserted in the main rod 1 constituting said push rod 5 and said front leg 6. The lower end of the first rod 18 is pivotally connected to a connecting bar 19. The other end of the connecting bar 19 is pivotally connected to the front end of a lever 20. The lever 20 is provided at the end of the front leg connecting rod 3 and adapted to be rotated integrally with the front leg connecting rod 3 about journal means 3'. With this arrangement, it will be understood that the bending motion of the push rods 4, as is apparent from comparison between FIGS. 2 and 3, is transmitted through the levers 16, connecting rods 17, first rods 18, connecting rods 19 and levers 20 to bring about the bending motion of the front leg connecting rods 3. In addition, the link mechanism associated with the first rod 18, etc., is provided on either side.

Referring to FIG. 1, levers 21 extend adjacent the upper ends of the rear legs 2 from the pivot pins 8. Each lever 21, as shown in FIG. 6, is fixed at one end thereof to the rear leg 2 by a pin 22 and has the pivot pin 8 inserted in its intermediate portion. Therefore, the lever 21 will be rotated integrally with the rear leg 2. A second rod 23 is connected between the front end of the lever 21 and the intermediate portion of the front leg connecting rod 3. Therefore, it will be understood that as the front leg connecting rods 3 are upwardly bent, the second rods 23 push up the levers 21 to reduce the angle which the rear legs form with the front legs 6.

A third rod 63 is connected between the intermediate portion of the rear connector 62 and the side of the pivot mount 7 adjacent the push rod 5. It will be understood that when the rear legs 2 are rotated to reduce their angle with the front legs 6, the third rods 63 pull up the rear leg connecting rods 61 to guide the latter so that they are upwardly bent.

Guide members 30 are provided on the surfaces of the front legs 6 facing downwardly and rearwardly. Each guide member 30 receives one end of a prop bar 31 to support it for slide movement for a predetermined distance, the other end of said prop bar being pivotally connected to the rear leg 2. Therefore, when said one end of the prop bar 31 reaches the upper end of the guide member 30, the maximum angle which the rear leg 2 forms with the front leg 6 is defined.

The arrangement associated with a hammock omitted from the illustration in FIG. 1 will now be described with reference to FIGS. 4 and 5.

A hammock retaining frame 64 has a pair of right and left lateral rods 65 and bendable back-connecting rods 66 are installed between the upper ends of said lateral rods 65. Each lateral rod 65 has a retaining frame pivot mount 67 attached thereto substantially at the intermediate portion thereof, said pivot mount having a hole 68 in which the above mentioned pivot pin 8 of the pivot mount 7 is received, so that the hammock retaining frame 64 is pivotally mounted so as to be rotatable relative to the main rods 1 (see FIG. 6).

A wire 69 is inserted in each lateral rod 65 and one end of said wire is connected to an operating knob 70 pivotally supported on the upper back surface of the lateral rod 65, the other end of said wire being connected to a pin 72 fixed to one end of a reclining member 71. The reclining member 71 is pivotally supported by a pivot pin 74 on an attachment plate 73 attached to and extending from the downwardly rearwardly facing surface of the lateral rod 65, and the lateral surface of the lateral rod 65 is provided with a longitudinal hole 75 allowing the movement of the pin 72 in response to the rotation of the reclining member 71. The reclining member 71 has e.g. two engagement recesses 77 and 78 for engagement with an engagement pin 76 projecting from the inner side of the front leg 6 and is urged counterclockwise by a spring 80 installed between the pin 72 and a pin 79 which is provided inside the lateral rod 65. Thus, the selective engagement of the engagement pin 76 with the engagement recess 77 or 78 will retain the hammock retaining frame 64 either in the normal position or in the reclined position. Footrest retaining bars 81 project forwardly from the lower ends of the lateral rods 65 and a footrest 82 is installed between said footrest retaining bars 82. The footrest 82 is adapted to be upwardly foldable in two, as indicated by phantom lines in FIG. 4. Since the back-connecting rods 66 are also upwardly foldable in two, the two lateral rods 65 of the hammock retaining frame 64 are movable toward and away from each other. The mechanism is arranged to allow the folding or collapsing of the baby carriage. In addition, the footrest 82 is arranged not to be bendable downwardly.

Figure 7:
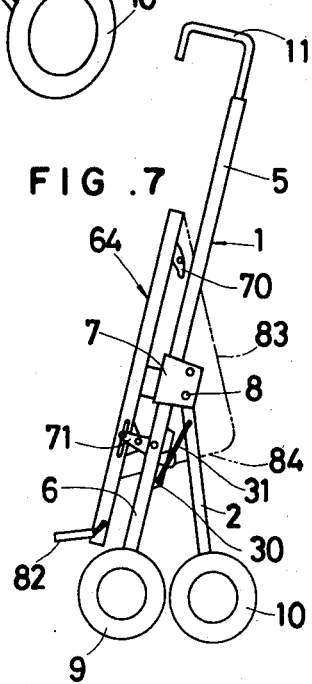
FIG. 7 is a complete side view schematically illustrating the leg-closed state of the collapsible baby carriage of FIG. 1.
Figure 4:
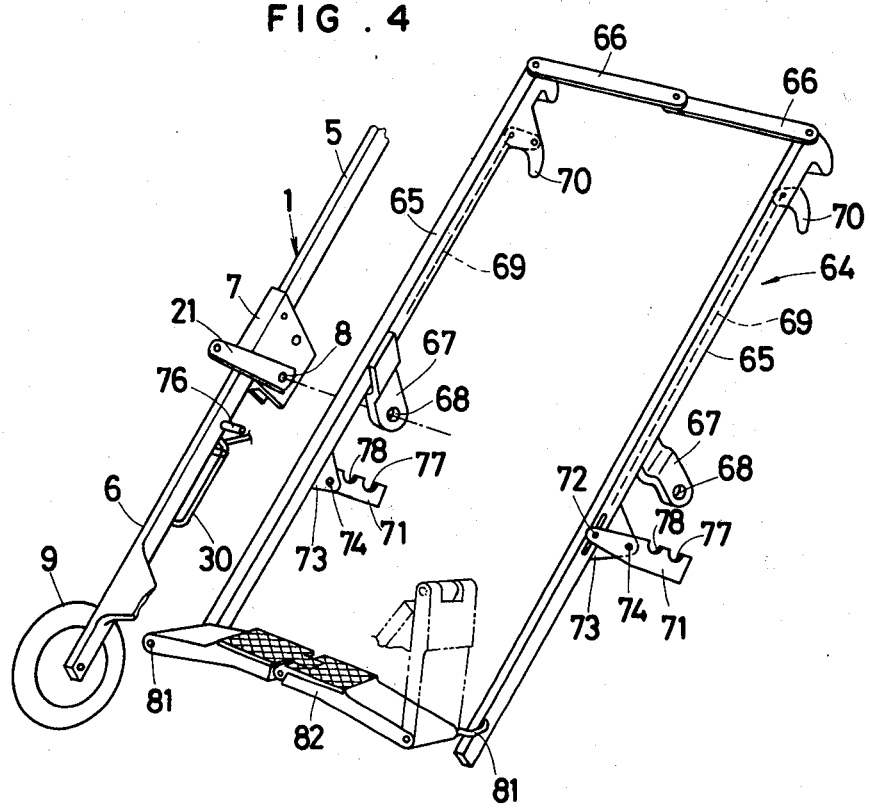
FIG. 4 is a perspective view of a principal portion for explanation of the manner of attaching a hammock which can be advantageously attached to the collapsible baby carriage of FIG. 1.
Figure 5:
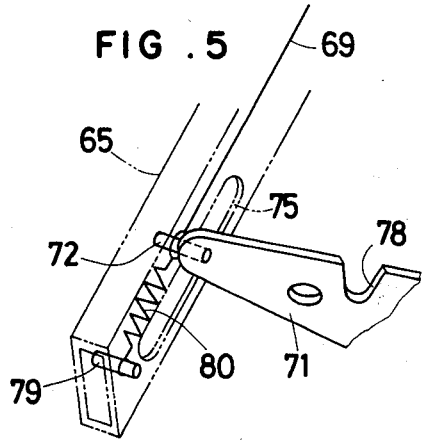
FIG. 5 is a fragmentary perspective view showing a further principal portion of FIG. 4.

The footrest 82 forming a portion of the hammock has been shown in FIG. 4, while the back 83 and seat 84 of the hammock are shown in phantom lines in FIG. 7. The back 83 and seat 84 are formed of suitable sheeting and attached to the hammock retaining frame 64 by having their end edges wrapped around the hammock retaining frame 64. The sheeting which forms said back 83 and seat 84 is such as to be capable of being suitably wrinkled to allow the movement of the lateral rods 65 toward and away from each other in response to the collapsing of the baby carriage.

The baby carriage shown herein is designed so that collapsing will proceed as the operating knob 14 associated with the upper connector 13 bendably interconnecting the push rod connecting rods 4, is manipulated. The baby carriage is provided with locking means for locking the baby carriage in its leg-opened state and in its leg-closed state so as to improve safety. This will now be described with reference to FIGS. 8 through 11.

The bending of the push rod connecting rods 4 is effected by the portion including the upper connector 13, as described above. The upper connector 13 includes a first locking plate 51 and a second locking plate 52 which are pivotally mounted on a pivot shaft 50. Each of the locking plates 51 and 52 has an outer peripheral surface forming part of a circle. The first locking plate 51 is secured to the left-hand side push rod connecting rod 4. The second locking plate 52 is secured to the right-hand side push rod connecting rod 4, as illustrated. The outer peripheral surface of the first locking plate is provided with a first notch 53. The outer peripheral surface of the second locking plate 52 is provided with a second notch 54 disposed to be aligned with the first notch 53 when the push rod connecting rods 4 are brought to the most straightened state shown in FIGS. 8 and 9. Further, the outer peripheral surface of the second locking plate 52 is also provided with a third notch 55 which is so positioned as to be aligned with the first notch 53 when the push rod connecting rods 4 are brought to the most bent state shown in FIG. 11.

There is provided a locking member 57 (best shown in FIG. 10) having a key-like portion 56 engageable with the first notch 53 and the second notch 54 or third notch 55 when they are aligned with each other, said locking member being movable in opposite directions as indicated by an arrow 58. Thus, the locking member 57 is held between the second locking plate 52 and the member forming the operating knob 14 and fixed to the left-hand side push rod connecting rod 4, as viewed in FIGS. 8 and 9, and in this held state it is slidable in the directions indicated by the arrow 58. The locking member 57 is formed with an operating portion 59 projecting therefrom in a direction perpendicular to the arrow 58. A spring 60 is interposed between the back of the operating portion 59 and the operating knob 14 to resiliently urge the entire locking member 57 to the left as viewed in FIGS. 8 and 9. That is, the spring 60 urges the locking member at all times to cause the key-like portion 56 to engage the notches 53 and 54 or 55.

FIGS. 8 and 9 illustrate the state in which the key-like portion 56 has engaged the first and second notches 53 and 54 aligned with each other. In this state, the relative rotation of the first and second locking plates 51 and 52 pivotally mounted on the single pivot shaft 50 is prohibited, so that the right and left push rod connecting rods 4 are fixed in the most straightened state.

In order to achieve the most bent state of the push rod connecting rods 4 shown in FIG. 11, this can be effected by displacing the locking member 57 to the left as viewed in FIGS. 8 and 9 against the resilient force of the spring 60, whereupon the key-like portion 56 is disengaged from the notches 53 and 54. In addition, this operation may be effected by gripping the operating knob 14 with four fingers, exclusive of the thumb, and pressing the thumb against the operating portion 59 to push in the locking member 57. In this state, when the operating knob 14 is raised, the push rod connecting rods 4 will be upwardly bent, since the key-like portion 56 has been disengaged from the notches 53 and 54. With the push rod connecting rods 4 brought to the most bent state, when the operating portion 59 of the locking member 57 is released from the thumb, the resilient force of the spring 60 urges the key-like portion 56 into engagement with the first and third notches 53 and 55. This state is shown in FIG. 11.

In FIG. 11, the key-like portion 56 of the locking member 57 is in engagement with the first and third notches 53 and 55, thereby prohibiting the relative rotation of the first and second locking plates 51 and 52. Therefore, the angle formed between the push rod connecting rods 4 is fixed in this state.

The collapsing operation and motion of the collapsible baby carriage described thus far will now be described.

FIGS. 1, 2 and 9 correspond to the leg-opened state of the baby carriage. In this leg-opened state, the front leg connecting rods 3, the rear leg connecting rods 61 and the push rod connecting rods 4 are disposed straight between the front legs 6, rear legs 2 and push rods 5, respectively. Therefore, the push rods 1 and the auxiliary rods (rear legs) 2 each have the widest spacing in this state. The rear legs 2 are most spaced apart from the front legs 6 and this state is defined by the prop bars 31.

In order to shift the baby carriage from the leg-opened state described above to the leg-closed state, this can be achieved by operating the operating portion 59 of the locking member 57 to unlock the locking member 57. This is followed by raising the operation knob 14, whereupon the push rod connecting rods 4 are upwardly bent under the weight of the baby carriage. In response to this bending of the push rod connecting rods 4, the front leg connecting rods 3 are upwardly bent through the first rods 18. In response to this upward bending of the front leg connecting rods 3, the rear legs 2 are rotated through the second rods 23 to approach the front legs 6 while the ends of the prop bars 31 slide within the guide members 30 until they are positioned relatively adjacent the lower ends thereof. In response to this approach of the rear legs 2 to the front legs 6, the third rods 63 cause the rear leg connecting rods 61 to bend upwardly, thus moving the rear legs 2 toward each other. Ultimately, an elongated collapsed state, as shown in FIGS. 3 and 7, is obtained. At this time, if the hand is removed from the operating portion 59 of the locking member 57, the baby carriage is fixed in this collapsed state, as shown in FIG. 11.

Reversely, in order to shift the baby carriage from the leg-closed state to the leg-opened state, this can be achieved by depressing the operating knob 14 while operating the operating portion 59 of the locking member 57 by one hand and holding one of the handles 11, so as to bring the push rod connecting rods 4 into a straight line. At this time, this leg opening operation may be assisted by treading on the upper surface of the rear connector 62 with one foot.

In the above embodiment, the baby carriage has been arranged so that its leg closing operation can be immediately accomplished by raising the operating knob 14. If, however, the push rod connecting rods 4 are arranged to be downwardly bendable, the leg opening operation of the baby carriage will be immediately accomplished by raising the operating knob.

Further, in the above embodiment, there have been provided prop bars 31 having one of their respective ends locked in the guide members 20 in order to positively define the maximum angle of the rear legs 2 with respect to the front legs 6 in the leg-opened state of the baby carriage. Such arrangement, however, has been adopted solely to increase a positive operation, but since the rear legs 2 are at least in an opened state with respect to the front legs 6 under their own weight and their maximum degree of opening is defined by the propping action of the second rods 23, there may be cases where the prop bars 31 are not necessary. In addition, instead of providing the prop bars 31 for defining the maximum degree of opening, a suitable abutment may be provided on each pivot mount 7 so that the rear leg 2 may bear thereagainst.

Another embodiment of the invention will now be described which has a baggage basket. Such basket is installed to extend between the auxiliary rods (rear legs) 2 of the collapsible baby carriage described above with reference to FIGS. 1 through 11 and is held by the rear legs 2.

Referring to FIGS. 12 through 15, a basket 100 comprises frame members 101 and a bag 102 (indicated by phantom lines in FIG. 13) positioned in a space surrounded with and supported by said frame members 101.

The frame members 101 include links 103, . . . , 110 which cross X-wise and which are journalled in pairs. One end of the link 103 is bent at a right angle to form a rotary shaft 111, which is attached to one rear leg 2 by a bearing 112. Similarly, a rotary shaft 113 at one end of the link 109 positioned symmetrically to the link 103 is attached to the other rear leg 2 by a bearing 114. The link 104 crosses the link 103 and the two links 103, 104 are journalled at the intersection to form a pair. One end of the link 104 is bent at a right angle to form a rotation locking shaft 115, which is freely slidable over a predetermined length in a guide 116 extending lengthwise of and attached to one rear leg 2. Similarly, a rotation locking shaft 117 at one end of the link 110 positioned symmetrically relative to the link 104 is freely movable in a guide 118 attached to the other rear leg 2. In this manner, the links 103 and 104 define a first surface which extends on a plane crossing along one rear leg 2, a plane defined by the two rear legs 2. Further, the links 109 and 110 define a second surface which extends on a plane crossing along the other rear leg 2, said plane defined by the two rear legs 2. Besides the first and second surfaces, the frame members 101 define a third surface to be later described which is a surface opposed to and spaced away from the rear legs 2 and which connects the end edges of the first and second surfaces.

In the third surface, the links 105 and 106 X-wise cross each other and are journalled at the intersection. Similarly, the links 107 and 108 X-wise cross each other and are journalled at the intersection. The links 105 and 108 and the links 106 and 107 are journalled at one of their respective ends.

The links defining said third surface and the links defining the first and second surfaces are respectively connected by joints 119, 120, 121 and 122. The manner of connection by the joints 119 and 120 is shown in FIG. 14. The joint 119 rotatably holds a rotary shaft 123 bent and formed at the end of the link 104 and a rotary shaft 124 formed at the end of the link 105 and extending in a direction in which it crosses the rotary shaft 123. Further, the joint 120 rotatably holds a rotary shaft 125 at the end of the link 103 and a rotary shaft 126 at the end of the link 106. Similarly, the joints 121 and 122 symmetrically positioned with respect to the joints 119 and 120 rotatably hold the links 108 and 110 and the links 107 and 109, respectively. The collapsible frame members 101 are arranged in the manner described. In addition, links 127 and 128 foldable in two may be rotatably provided between one rotary shaft 111 of the link 103 and the rotary shaft 124 of the link 105. Similarly, and symmetrically therewith, though not shown, links may be provided on the rotary shaft 113 of the link 109 and the rotary shaft at the end of the link 108. However, such links are not absolutely necessary.

In a space surrounded with the frame members 101 described above, a bag 102 indicated by phantom lines in FIG. 13 is installed. The bag 102 is supported on the frame members as by a string. The bag 102 is formed of a foldable sheet, such as netting or fabric, so that it can be folded in response to the collapsing action of the frame members 101.

The basket 100, as best shown in FIGS. 12 and 13, is positioned behind the rear legs 2. The basket 100 will be collapsed as a result of the spacing between the rear legs 2 being reduced in response to the collapsing action of the baby carriage already described. Collapsing the basket will be described below.

In the leg-opened state of the baby carriage, the basket 100 is open. In this open state, the rotation locking shafts 115 and 117 of the links 104 and 110 are locked at the upper ends of the guides 116 and 118, whereby the full open size of the basket 100 is defined. When baggage is received in the basket 100 and its weight acts on the frame members 101, the links 104 and 110 tend to further tilt transversely, but since their action is controlled by the guides 116 and 118, they will not further open and they will also not close.

With the basket 100 in the open state described above, if the baby carriage is closed, the rear legs 2 approach each other, as already described. Referring to FIGS. 12 and 15 which is a diagram as viewed from the back of the basket 100 of FIG. 12, the action of the rear legs 2 moving toward each other causes the links 103 and 104 and links 109 and 110 to rotate the links 105, 106, 107 and 108 in such a manner as to extend them relatively longitudinally, said rotation causing the links 103 and 104 and links 109 and 110 to turn relatively longitudinally. In response thereto, the rotation locking shafts 115 and 117 of the links 104 and 110 are moved downwardly along the guides 116 and 118 and the third surface defined by the links 105, 106, 107 and 108 approaches the rear legs 2, whereby a relatively elongated collapsed state is obtained.

Another embodiment of the invention will be described which, like the above embodiment, has a basket added thereto. The basket to be presently described will be advantageously attached to the collapsible baby carriage described with reference to FIGS. 1 through 11. More particularly, a basket can be attached to a collapsible baby carriage which comprises a pair of right and left push rods 5, a pair of right and left rear legs 2 pivotally connected to said push rods 5 so that they will be brought to the leg-opened state when turned backwardly relative to the push rods 5 and they will be brought to the leg-closed state when turned forwardly relative to the push rods 5, and a pair of right and left lateral rods 65 for a hammock retaining frame 64 which are pivotally connected to the push rods 5 so that they can adjust the reclined state of the hammock in accordance with the pivotal motion thereof.

Referring to FIGS. 16 through 19, a basket 200 comprises a framework, means for attaching the framework to the baby carriage proper, and a bag held by said framework.

The framework includes upper side members 201, rear side members 202, and an upper side member 203. The right and left and upper side members 201 and 203 are formed of a linear body, such as a coil spring which is light in weight, inexpensive, extensible and bendable. Therefore, it is capable of advantageously accommodating dimensional errors in the other members of the basket 200, making it possible to increase the efficiency of operation without requiring precision in manufacture and to provide room for receiving relatively large baggage. The bendability of the rear upper side member 203 allows a reduction in the spacing between the right and left upper side members 201 and between the right and left rear side members 202 which results from the collapsing of the baby carriage as described above. The ends of the right and left upper side members 201 are pivotally connected to the ends of the right and left rear side members 202, and the rear upper side member 203 is connected between the L-shaped bends formed at the ends of the right and left rear side members 202.

In order to attach the framework to the baby carriage proper, fixtures 204 are attached to the lateral rods 65 of the hammock retaining frame 64, and fixtures 205 are attached to the upper surfaces of the right and left rear legs 2. The ends of the right and left upper side members 201 are pivotally connected to the fixtures 204 by pins 206, and the ends of the right and left rear side members 202 are pivotally connected to the right and left fixtures 205.

A bag 207 for receiving baggage has an opening in its upper surface and is formed, e.g., of a net. The bag 207 is attached to and held by said upper side members 201, 203 and rear side members 202 in such a manner that the sides of the bag extend along these members. For reinforcing purposes, at least one side of the upper surface opening in the bag 207 which connects the pins 206 is formed of a thick string. In addition, in order to further increase strength, the other sides may also be formed of such thick string. If the bag 207 is formed of a net in this way, the structure is inexpensive and light in weight. Further, when the user goes shopping and buys something, which is usually packaged in a paper bag, the article will not slip out through the meshes of the net.

In the leg-opened state of the baby carriage, as shown in FIGS. 16 and 18 the rear legs 2 are positioned rearwardly of the push rods 5, withs the right and left rear side members 202 positioned remote from the push rods 5 and lateral rods 65, so that the right and left upper side members 201 assume a rearwardly extending state. This state allows loading and unloading through the upper surface opening. In addition, in the state shown in FIG. 18, the hammock, i.e., the retaining frame 64 has relatively risen, with the upper surface opening in the basket 200 positioned behind the back 83 of the hammock.

When the hammock retaining frame 64 is reclined from the state of FIG. 18 to the state of FIG. 19, since the fixtures 204 are attached to the lateral rods 65, the right and left upper side members 201 cause the right and left rear side members 202 to tilt somewhat rearwardly. In this state, since the right and left upper side members 201 held by the lateral rods 65 of the hammock retaining frame 64 retaining the hammock, the upper surface opening in the basket 200 is also displaced in accordance with the displacement of the hammock. Therefore, irrespective of the reclined state of the hammock, there is no possibility of the back of the hammock overhanging the upper surface opening in the basket 200 to interfere with loading and unloading.

When it is desired to close the baby carriage, it is desirable that the hammock retaining frame 64 be in a tilted state shown in FIG. 18. When the baby carriage is closed, as already described, the motion is such that the rear legs 2 and the lateral rods 65 respectively approach each other while the rear legs 2 turn forwardly relative to the push rods 5 to approach the front legs 6. The motion of the rear legs 2 and of the lateral rods 65, respectively approaching each other, causes the bending of the rear upper member 203. Further, the forward turning of the rear legs 2 increases the angle between the right and left upper side members 201 and the right and left rear side members 202, moving the upper side members 201 and rear side members 202 toward the push rods 5 and rear legs 2. Ultimately, as shown in FIG. 17, the upper side members 201 and rear side members 202 come into approximate alignment with each other, establishing the folded state of the basket 200 in which said members do not substantially protrude out of the contour of the baby carriage proper. In addition, since the bag 207 attached to the basket 200 is formed, e.g., of a net, it can easily deform, having no possibility of interferring with the folding operation of the portion constituting the framework of the basket 200.

In this manner, another basket 200 has been obtained which opens and closes in operative association with the opening and closing of the baby carriage. This basket 200 can also be folded widthwise. Because of such construction, the rear upper side member 203 has been formed of a linear body in the form of a coil spring to utilize its bendability, but it is not limited to such linear body and it is possible to use a plurality of links connected in turning pairs.

The hammock attached to the first embodiment described with reference to FIGS. 1 through 11 has been constructed so that its back 83, seat 84 and footrest 82 are supported by the unbendable hammock retaining lateral rods 65. As a result, the reclining operation of the back 83 causes the tilting of the seat 84, and particularly when it is reclined to the extent that the lateral rods 65 assume a substantially horizontal position, the back 83 and seat 84 define a bag-like receptacle for receiving a baby. This may cause the baby to assume an unnatural posture, which is not desirable from a medical point of view. The embodiment to be described below provides improvements in this respect.

FIGS. 20 through 25 are views for explanation of a further embodiment of the invention. This embodiment is the same as the one described with reference to FIGS. 1 through 11, except for the arrangement associated with the hammock.

Referring to FIGS. 20 through 25, hammock retaining lateral rods 150 are each divided into three parts connected together by hinges. More particularly, the intermediate part is a fixed link 151 secured by brackets 152 and 153 to the main rod 1 and to the pivot mount 7 fixed to said main rod 1. The upper end of the fixed link 151 has an upper movable link 155 connected thereto by an upper hinge 154. The lower end of the fixed link 151 has a lower movable link 157 connected thereto through a lower hinge 156. The upper movable link 155 is provided with a bracket 158, while the lower movable link 157 is provided with a bracket 159. An intervening link 160 which is formed of a rigid bar, such as a metal bar, is connected between said brackets 158 and 159. With the linkage thus constructed, since the upper hinge 154 and lower hinge 156 are positioned on the same side as the intervening link 160, it will be understood that the upper movable link 155 and lower movable link 157 will be rotated in the same direction in interlocked relation. The manner of such rotation is shown in FIGS. 22, 24 and 25.

Such rotation of the upper and lower movable links 155 and 157 depends on the adjustment of the inclination of the back of the hammock and on the positional adjustment of the footrest. More particularly, as diagrammatically shown in FIG. 21, the back 161 of the hammock is supported by the upper movable links 155. The seat 162 of the hammock is supported by the fixed links 151. The footrest 163 of the hammock is supported by the lower movable links 157. The back 161 and seat 162 are connected by a substantially integral sheet, and by wrapping such sheet around the hammock retaining lateral rods 150, the back 161 and seat 162 are supported. The reclining motion of the back 161 produces some wrinkle in the sheet, whereby the reclining motion of the back 161 is allowed. The sheet is omitted from the illustration. Further, as diagrammatically shown in FIG. 21, armrests 164 supported by the fixed links 151 may be provided. The footrest 163 is best shown in FIG. 20. The footrest 163 is supported on and extends between footrest holding bars 165 forwardly projecting from the lower movable links 157. The footrest 163, as shown in phantom lines in FIG. 20, is upwardly foldable in two, and, as described, it is so constructed as to allow the collapsing of the baby carriage. In addition, the footrest 163 is so constructed as not to be downwardly bendable.

With the back 161 supported by the upper movable links 155 and the footrest 163 supported by the lower movable links 157, as described above, if the upper and lower movable links 155 and 157 are rotated in the same direction, it will be understood that irrespective of the seat 162 being at a fixed angle of inclination, the back 161 will be reclined and the footrest 163 will change its position in accordance with the reclined state of the back 161. In order to make such adjustment, the following arrangement has been adopted.

The upper movable links 155 of the hammock retaining lateral rods 150 are slidably and fixably provided with slide members 166. Each slide member 166 includes a sleeve portion 167 fitted on the upper end of the upper movable link 155. Such sleeve portion 167 slides on the upper movable link 155. A prop link 168 is connected between such slide member 166 and a fixed portion of the baby carriage proper, e.g., the pivot mount 7. In such linkage, the upper hinge 154 and the lower end of the prop link 168 are fixed portions and since the length of the prop link 168 is constant, it will be understood that the angle of inclination of the upper movable link 155 with respect to the fixed link 151 is changed with the slide movement of the slide member 166 relative to the upper movable link 155. Each time the angle of inclination of the upper movable link 155 is changed, the resulting state of the same can be maintained if the slide member 166 and upper movable link 155 are fixed in their positions.

Referring to FIGS. 22 through 25, a stop 169 is pivotally mounted on a pivot pin 170 for fixing the slide member 166 and upper movable link 155. A kick spring 171 is mounted on said pivot pin 170, with its ends abutting against a projection on the slide member 166 and the abutment surface 173 of the stop 169, thereby urging the stop 169 in a clockwise direction as viewed in FIG. 23. A locking pin 174 projects from the abutment surface 173 of the stop 169. The sleeve portion 167 is provided with an insertion hole 175 for receiving the locking pin 174. When the locking pin 174 is inserted into the insertion hole 175, its front end engages one of the first, second and third engagement holes 176, 177 and 178 formed in the upper movable link 155.

FIG. 22 shows the locking pin 174 engaged with the first engagement hole 176. In this state, the slide member 166 is brought closest to the upper hinge 154, and the upper movable link 155, fixed link 151 and lower movable link 157 are arranged in line. This state corresponds to the state in which the back 161 of the hammock rises to the greatest degree.

In order to change the reclined state of the back 161 of the hammock from the state of FIG. 22, this may be achieved by turning the stop 169 counterclockwise against the resilient force of the kick spring 171 to disengage the locking pin 174 from the first engagement hole 176. The upper movable link 155 is then tilted, whereby the slide member 166 is slid relative to the upper movable link 155. When the stop 169 is released during this slide movement, the locking pin 174 will engage, e.g., the second engagement hole 177, thereby prohibiting said slide movement. This state is shown in FIG. 24.

Referring to FIG. 24, the upper movable link 155 is more tilted than it is in FIG. 22. Therefore, the back 161 has been further reclined. Such movement of the upper movable link 155 is transmitted to the lower movable link 157 through the intervening link 160 and hence the footrest 163 supported by the lower movable links 157 is displaced. The position of the footrest 163 thus displaced is suited to the reclined state of the back 161 and provides a comfortable posture for the baby.

Further, the stop 169 may be operated to establish a state shown in FIG. 25 in which the locking pin 174 engages the third engagement hole 178. This state corresponds to the state in which the back 161 of the hammock is reclined to the greatest degree.

In the manner described above, the angle of inclination of the upper movable link 155 is changed by the action of the slide member 166 and prop link 168, and the angle of inclination of the lower movable link 157 is likewise changed through the intervening link 160. Thus, there has been obtained a hammock for use with baby carriages which is so designed that the angle of inclination of the back 161 of the hammock and also the position of the footrest 163 are adjustable.

In addition, the above embodiment has utilized the action of the slide member 166 and of the prop link 168 in order to effect the tilting (rotation) and fixing of the upper movable link 155, but the invention is not limited thereto and, for example, the upper hinge 154 itself may to be made fixable.

Further, in the relation between the upper and lower movable links 155 and 157 interlocked with each other, the upper movable link 155 has been described as a driving link and the lower movable link 157 as a driven link in the above embodiment, but this driving-driven relation may be reversed.

A further embodiment of the invention will now be described with reference to FIGS. 26 through 29. In describing this embodiment, portions or parts corresponding to those described with reference to FIGS. 1 through 11 are given the same reference numerals to avoid a repetition of description.

Figure 27:
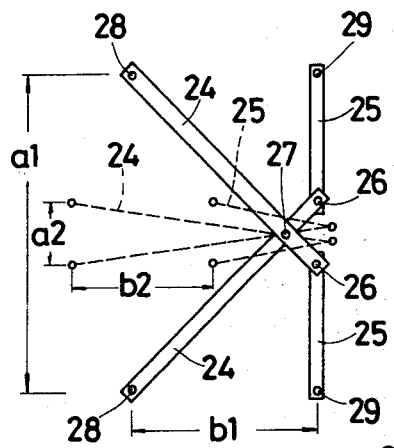
FIG. 27 is a diagrammatic view of connecting links for the front and rear legs, said links forming a portion of a collapsing mechanism in the collapsible baby carriage of FIG. 26.
Figure 26:
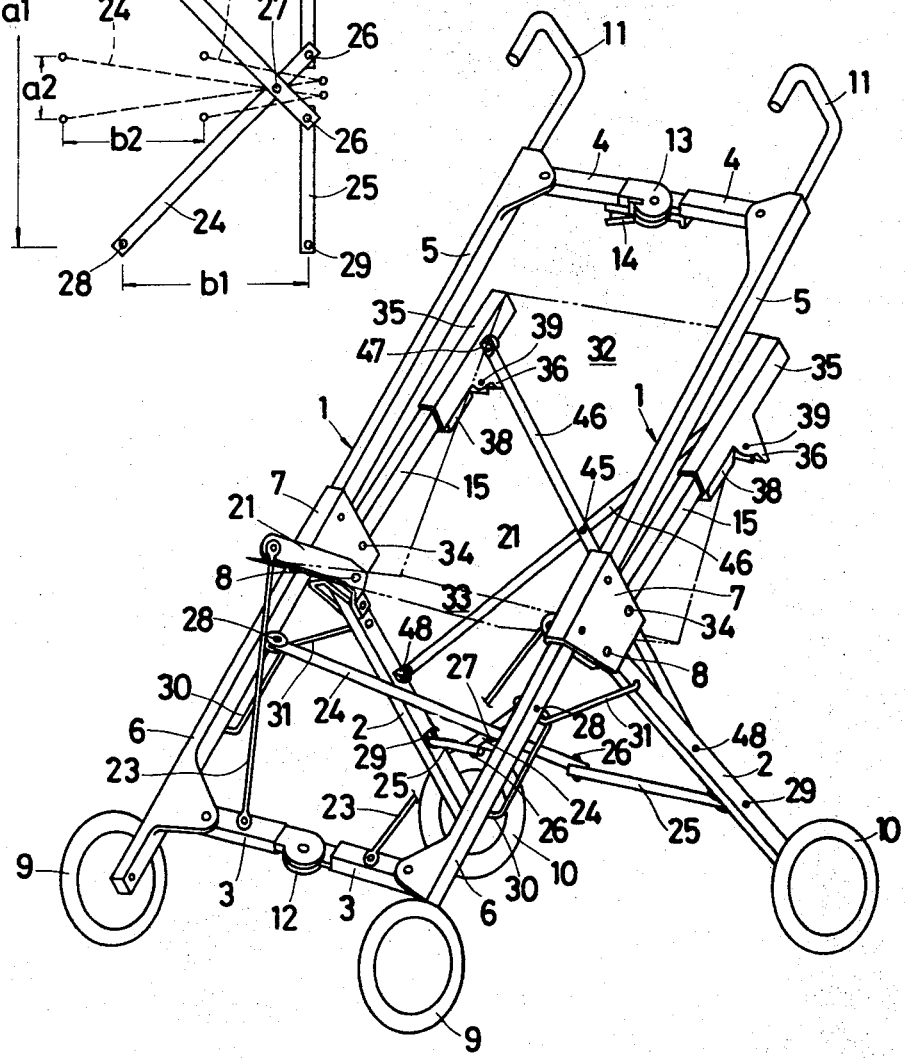
FIG. 26 is a complete perspective view for explanation of another embodiment of the invention, illustrating the framework of a collapsible baby carriage in its leg-opened state.

In this embodiment, instead of the rear leg connecting rods 61 and third rods 63 described above, links including transversely extending long rods 24 and transversely extending short rods 25 are connected between the intermediate portions of the front legs 6 and the intermediate portions of the rear legs 2. More particularly, the front legs 6 and the rear legs 2 opposed thereto are connected by means of the transversely extending long and short rods 24 and 25 pivotally connected together at pivot points 26 at their ends. Therefore, the transversely extending long rods 24 X-wise cross each other and are pivotally connected together at a pivot point 27. The transversely extending long rods 24 are attached to the front legs 6 by means 28 in the nature of a universal joint. Further, the transversely extending short rods 25 are attached to the rear legs 2 by means 29 in the nature of a universal joint. This arrangement is best shown in FIG. 27. Referring to FIGS. 26 and 27, when the rear legs 2 are rotated to reduce the angle of the rear legs with respect to the front legs 6 and the spacing between the main rods 1 (front legs 6) is reduced as the connecting rods 3 and 4 are bent, the dimension "a1" changes to "a2" and the dimension "b1" changes to "b2", as shown in FIG. 27. It will be understood, therefore, that this arrangement provides advantageous guidance such that the spacing between the rear legs 2 is reduced (from dimension "a1" to dimension "a2") and that the rear legs 2 approach the front legs 6 (from dimension "b1" to dimension "b2").

Instead of the hammock previously described, a modified hammock is installed. A hammock shown in phantom lines in FIG. 26 comprises a back 32 and a seat 33. The seat 33 is fixedly installed by utilizing a suitable component of the baby carriage, while the back 32 is retained by back-retaining rods 15, so that it can be adjusted for reclining purposes in accordance with a change in the angle of inclination of said back-retaining rods 15. In addition, the material and arrangement of this hammock are so selected as not to interfere with the collapsing motion of the baby carriage (or the motion by which it is deformed into an elongated form).

Figure 28:
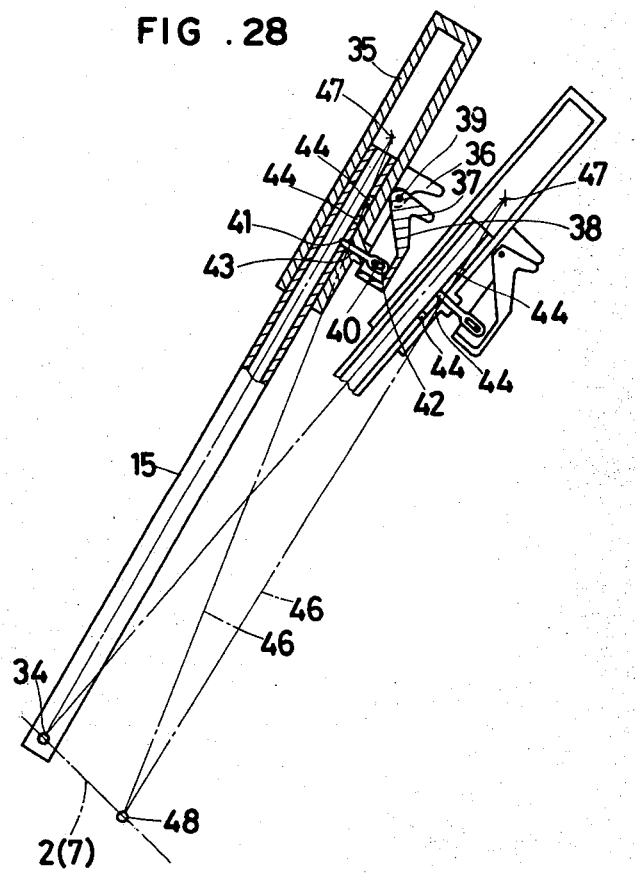
FIG. 28 is a partly sectioned enlarged view for explanation of the details and operation of a back-retaining rod and some elements associated therewith, included in the collapsible baby carriage of FIG. 26.

Referring to FIGS. 26 and 28, the back-retaining rods 15 are clamped by the pivot mounts 7 and pivotally mounted on pivot pins 34. Therefore, the back-retaining rods 15 extend rearwardly upwardly from the middle of the baby carriage proper and are turnable forwardly and rearwardly. Fitted on the upper end of each back-retaining rod 15 is a sleeve-like slide 35 which is slidable over a certain distance lengthwise of the back-retaining frames 15. A first operating element 36 is fixed to each slide 35 and projects therefrom, and an operating lever 38 associated with said first operating element 36 is pivotally mounted on a pin 39. The operating lever 38 is constantly urged clockwise as viewed in FIG. 28 by a suitable spring (not shown). The active portion of the operating lever 38 is fixedly provided with a pin 40 which is received in an elongated opening 42 formed in the root of an engagement pin 41 serving as an engagement projection. The engagement pin 41 is inserted in an aperture 43 formed in the slide 35. Therefore, as the operating lever 38 is turned, the front end of the engagement pin 41 will go in and out of the aperture 43. In connection with the position where the engagement pin 41 goes in and out, the back-retaining rod 15 is provided with a plurality (e.g., three) engagement holes 44 distributed lengthwise thereof. The front end of the engagement pin 41 can be selectively inserted into any one of these engagement holes 44, which means that the slide 35 can be slid selectively to any one of a plurality of corresponding positions on the back-retaining rod 15 and can be fixed thereat. In addition, the coupling between the operating lever 38 and the engagement 41 has been described as being effected by the use of a combination of the pin 40 and elongated opening 42 for receiving the same, the intention being to guide the engagement pin 41 in a direction perpendicular to the back-retaining rod 15 irrespective of the turned state of the operating lever 38. This arrangement has an advantage that the engagement pin 41 can engage the engagement holes 44 more firmly.

Prop bars 46 X-wise crossing each other and pivotally connected together at a pivot point 45 are connected between the slides 35 and the rear legs 2 diametrically opposed thereto. The upper ends of the prop bars 46 are attached to the slides 35 by means 47 in the nature of a universal joint, while the lower ends of the prop bars 46 are attached to the rear legs 2 by means 48 in the nature of a universal joint.

With the arrangement associated with the hammock provided in the manner described above, in the leg-opened state of the baby carriage as shown in FIG. 26, the tilted state of the back-retaining rods 15 can be changed, so that the reclining adjustment of the back 32 becomes possible. The operation thereof will now be described.

With the baby carriage in the leg-opened state, since the spacing between the rear legs 2 is fixed and hence the degree of opening of the prop bars 46 is fixed, it follows that the distance between the vertically spaced ends of the two prop bars 46 is also fixed. Therefore, as shown in FIG. 28, the two prop bars 46 may be considered to be a link 46 having a constant length. Therefore, as shown at the left of FIG. 28, when the engagement pin 41 and an engagement hole 44 are engaged with each other, the slide 35 is kept fixed with respect to the retaining rod 15 and since the three links are connected at points 34, 47 and 48, these links will produce no relative motion. Therefore, this tilted state of the back-retaining rod 15 will be maintained, provided that the slide 35 does not slide.

When it is desired to change the tilted state of the back-retaining rod 15, this is achieved by gripping the first and second operating elements 36 and 37 to turn the operating lever 38 counterclockwise as viewed in FIG. 28, whereupon the state shown at the right of FIG. 28 is established. That is, the engagement pin 41 is withdrawn from the engagement hole 44, enabling the slide 35 to slide with respect to the back-retaining rod 15. Such slide movement is produced through the prop bar 46. Therefore, while performing the operation for changing the tilted state of the back-retaining rod 15, the state of the back 32 may be observed, and when a suitable tilted state thereof is attained, the nearest engagement hole 44 which the engagement pin 41 will engage in that state may be selected. The operation for selecting such engagement hole 44 may be effected by removing the hand from the operating elements 36 and 37 to allow the engagement pin 41 itself to find its mating engagement hole 44, so that the desired engagement will be automatically attained once they are aligned with each other. With this engagement thus attained, the adjusted reclined state of the back retaining rods 15, i.e., of the back 32 of the hammock will be fixed.

The collapsing operation of this collapsible baby carriage will now be described.

FIG. 26 illustrates the leg-opened state of the baby carriage. In this leg-opened state, the front leg connecting rods 3 and the push rod connecting rods 4 are linearly disposed between the front legs 6 and the push rods 5, respectively. Therefore, this is the state in which the spacing between the main rods 1 and between the auxiliary rods (rear legs) 2 is largest. Also, the rear legs 2 are most widely opened with respect to the front legs 6, and this state is defined by the prop bars 31.

Figure 29:
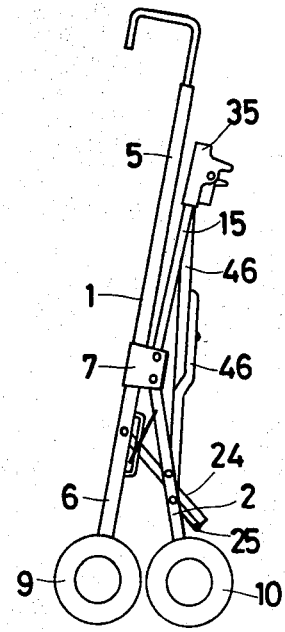
FIG. 29 is a complete side view, schematically illustrating the leg-closed state of the collapsible baby carriage of FIG. 26.

In order to shift the baby carriage from the above described leg-opened state to its leg-closed state, it is necessary to manipulate the operating portion 59 of the locking member 57 previously described with reference to FIG. 8 to thereby unlock the upper connector 13. The next step is to raise the operating knob 14, whereupon the push rod connecting rods 4 are upwardly bent. In response to this bending of the push rod connecting rods 4, the front leg connecting rods 3 are upwardly bent through the first rods 18. In response to this upward bending of the front leg connecting rods 3, the rear legs 2 are rotated through the second rods 23 to approach the front legs 6, with the ends of the prop bars 31 sliding within the guide members 30 until they are positioned at the lower ends of the latter. In response to this approach of the rear legs 2 to the front legs 6, the transversely extending long and short rods 24 and 25 are moved in interlocked relation, thus bringing the rear legs 2 close to each other. The prop bars 46 X-wise crossing each other are tilted relative to each other in such a manner as to extend vertically, and the back-retaining rods 15, without being displaced relative to the main rods 1, are moved toward each other, allowing said collapsing of the rear legs 2. Ultimately, an elongated collapsed state is obtained, as shown in FIG. 29. At this time, if the hand is removed from the operating portion 59 of the locking member 57, the baby carriage will be fixed in this collapsed state, as shown in FIG. 11 described previously.

Reversely, when it is desired to shift the baby carriage from the leg-closed state to the leg-opened state, this may be achieved by depressing the operating knob 14 relative to the main rods 1 while manipulating the operating portion 59 of the locking member 57, so as to bring the push rod connecting rods 4 into a straight line.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A collapsible baby carriage, comprising a pair of main rods (1), each main rod having an upper handle end and a lower end, auxiliary rods (2), each auxiliary rod having a pivot end and a free end, pivot means (7) operatively securing said pivot ends of said auxiliary rods to the respective main rod (1) intermediate the ends of the main rods, first wheel means operatively secured to said lower ends of the main rods, second wheel means operatively secured to the free ends of the respective auxiliary rods, first, second, and third cross-connecting means (4, 3, 61), first journal means (4') securing the first cross-connecting means (4) to said upper handle ends of said main rods, second journal means (3') securing the second cross-connecting means (3) to the lower ends of said main rods, third journal means (61') securing said third cross-connecting means (61) to the auxiliary rods, each of said cross-connecting means (4, 3, 61) comprising a respective hinge means (13, 12, 62) for folding the cross-connecting means (4, 3, 61), each of said hinge means (13, 12, 62) having a respective hinging axis all of which hinging axes are located in a common plane, first lever means (16, 20) and first linkage means (18) operatively interconnecting said first and second cross-connecting means (4, 3) for movement in unison in response to a folding operation of one of said first or second cross-connecting means, second lever means (21) and second linkage means (23) operatively interconnecting one of said cross-connecting means and said auxiliary rods whereby a folding operation of said cross-connecting means tilts said auxiliary rods toward said main rods so that said first and second wheel means come to be positioned adjacent to one another, third linkage means (63) operatively connected to said third cross-connecting means (61) for folding the third cross-connecting means (61) in response to tilting of said auxiliary rods (2) relative to said main rods (1), whereby all three cross-connecting means (4, 3, 61) are folded or unfolded substantially simultaneously with the tilting of the auxiliary rods (2), and hammock means (83) operatively disposed between said main rods for holding a baby.

2. The collapsible baby carriage of claim 1, wherein said first linkage means includes bars (18), which operatively interconnect the respective first lever means (16, 20) of the corresponding cross-connecting means (4, 3).

3. The collapsible baby carriage of claim 2, wherein each of said first lever means (16, 20) is adapted to be tilted in unison with the respective one of said cross-connecting means, said first lever means (16, 20) being operatively connected to said bars (18) and to the respective one of said journal means.

4. The collapsible baby carriage of claim 3, wherein said main rods are hollow tubular members and wherein said bars (18) are inserted in said tubular members.

5. The collapsible baby carriage of claim 1, wherein said first cross-connecting means (4) include a first pair of cross-connecting members (4) installed between said upper handle ends of said pair of main rods and the respective hinge means (13), and wherein said second cross-connecting means include a second pair of connecting members (3) installed between said lower ends of said pair of main rods and the respective hinge means (12).

6. The collapsible baby carriage of claim 5, wherein said second linkage means includes second bars (23).

7. The collapsible baby carriage of claim 6, wherein said second bars (23) are connected between said second cross-connecting means (3) and said auxiliary rods through said second lever means (21), whereby the motion for changing the angle of said auxiliary rods (2) with respect to said main rods (1) is operatively linked with the bending or folding motion of said second cross-connecting rods (3).

8. The collapsible baby carriage of claim 5, wherein said first and second pairs of cross-connecting members are upwardly bendable or foldable through said first and second hinge means, and wherein said second lever means (21) are operatively secured to said main rods (at 8), to said second bars (23), and to said auxiliary rods (2).

9. The collapsible baby carriage of claim 1, wherein said third cross-connecting means include a third pair of cross-connecting members (61) installed between said pair of auxiliary rods and the respective hinge means (62).

10. The collapsible baby carriage of claim 9, wherein said third linkage means include third bars (63) operatively connected to said third pair of cross-connecting members (61) and a fixed point for tilting the third connecting members (61) in response to movement of said auxiliary rods (2).

11. The collapsible baby carriage of claim 10, wherein said third bars (63) are connected to said third pair of cross-connecting members intermediate said third hinge means (62) and the respective journal means (61') on the one hand and said fixed point located on said pivot means (7) operatively securing said auxiliary rods to said main rods, whereby any tilting motion of said third pair of cross-connecting members (61) is operatively responsive to the motion for changing the angle of said auxiliary rods with respect to said main rods.

12. The collapsible baby carriage of claim 1, further including means for defining the maximum angle of opening between said auxiliary rods and said lower ends of said main rods, said lower ends forming front legs.

13. The collapsible baby carriage of claim 12, wherein said maximum angle defining means includes prop bars pivotally connected at one of their respective ends to said auxiliary rods, and guide means extending lengthwise of said front legs, said guide means slidably receiving the other ends of said prop bars for permitting a predetermined displacement of said prop bars.

14. The collapsible baby carriage of claim 1, wherein said hammock means is widthwise extendible and contractible.

15. The collapsible baby carriage of claim 1, wherein said hammock means comprises a back, a seat, and a footrest.

16. The collapsible baby carriage of claim 1, further including releasable locking means operatively connected to at least one of said cross-connecting means for prohibiting the folding of said at least one cross-connecting means.

17. The collapsible baby carriage of claim 16, wherein each of said first, second, and third means (13, 12, 62) comprises a single pivot shaft extending through the respective cross-connecting means, and wherein said locking means comprise first and second locking plates mounted on opposite sides of said cross-connecting means, said first locking plate having an outer peripheral surface provided with a first notch, said second locking plate having an outer peripheral surface provided with a second notch and with a third notch at different positions, and a key-like member adapted to engage two of said notches, namely said first notch and said second notch or said third notch when such two notches are aligned with each other, whereby when said first and second notches are aligned with each other and said key-like member engages the first and second notches, said cross-connecting means are in the unfolded, straight state and this straight state is fixed by the key-like member, and whereby upon withdrawal of the key-like member from said notches, the folding motion of said cross-connecting means is possible.

18. The collapsible baby carriage of claim 17, further including spring means for constantly urging said key-like member toward engagement with said notches.

19. The collapsible baby carriage of claim 17, wherein said first cross-connecting means comprise an operating knob for facilitating said folding.

20. The collapsible baby carriage of claim 19, further including an operating section for operating said operating knob, said operating section being disposed close to said operating knob, whereby when said operating knob is gripped by one hand, said operating section can be operated at the same time for facilitating said folding motion.

21. The collapsible baby carriage of claim 17, wherein said first and second locking plates each have an outer peripheral surface forming a particle circle.

22. The collapsible baby carriage of claim 1, wherein said first, second and third cross-connecting means are upwardly foldable.

23. The collapsible baby carriage of claim 1, wherein said first, second, and third cross-connecting means are downwardly foldable.

24. The collapsible baby carriage of claim 1, further including a pair of right and left hammock retaining lateral rods for holding at least two sides of the back of said hammock means, said lateral rods being pivotally supported to be rotatable relative to said main rods for changing the reclined state of said hammock means in accordance with said rotation, and means for fixing the tilted attitude of said hammock retaining lateral rods in a suitable position.

25. The collapsible baby carriage of claim 24, further including engagement pins each projecting from one of said main rods and wherein said fixing means includes engagement means rotatably installed on said hammock retaining lateral rods, each engagement means having a plurality of engagement recesses lengthwise distributed for selective engagement with said engagement pins.

26. The collapsible baby carriage of claim 25, wherein said fixing means further includes a spring which urges said engagement means in a direction allowing said engagement recesses in said engagement means to engage said engagement pin.

27. The collapsible baby carriage as set forth in claim 24, further including receptacle means for holding baggage therein, said receptacle being installed by utilizing said hammock retaining lateral rods and said auxiliary rods.

28. The collapsible baby carriage of claim 27, wherein said receptable means comprise a basket having right and left lateral surfaces, upper side members, and rear side members, one of the respective ends of said upper side members constituting the upper sides of said lateral surfaces being pivotally connected to said hammock retaining lateral rods, the other ends of said upper side members being pivotally connected to one of the respective ends of said rear side members which constitute the rear sides of said lateral surfaces, and the other ends of said rear side members being pivotally connected to said auxiliary rods, whereby the angle between said upper side members and said rear side members is changeable so as to allow the turning of said hammock retaining lateral rods, and when said baby carriage is brought to the folded state, the angle between said upper side members and said rear side members is increased to cause said basket to approach the upper portions of said main rods and said auxiliary rods so as to be collapsed.

29. The collapsible baby carriage of claim 27, wherein said receptable means includes a bag installed on said hammock retaining rods.

30. The collapsible baby carriage of claim 29, wherein said bag is formed of a netting material.

31. The collapsible baby carriage of claim 28, wherein said upper side members are formed of linear bodies in the form of a coil spring.

32. The collapsible baby carriage of claim 15, further including retaining members for retaining said back, seat and footrest with respect to said main rods.

33. The collapsible baby carriage of claim 32, wherein said retaining members for holding said seat and footrest are fixedly provided with respect to the main rods and the back-retaining members for holding said back are forwardly and rearwardly movable in a turning motion, and further including means for selectively fixing said back-retaining members at a plurality of positions changed according to said turning motion.

34. The collapsible baby carriage of claim 33, wherein said back-retaining members comprise a pair of right and left back-retaining rods for holding opposite sides of said back.

35. The collapsible baby carriage of claim 34, wherein said fixing means for said back-retaining rods includes slides so provided on said back-retaining rods as to be slidable and selectively fixable at a plurality of different positions lengthwise of said back-retaining rods, and prop bars connected between said slides and said auxiliary rods diametrically opposed thereto, said prop bars crossing each other in an X-wise manner and being pivotally connected to each other.

36. The collapsible baby carriage of claim 35, wherein said different positions comprise a plurality of engagement holes distributed along said back-retaining rods, said fixing means including engagement projections disposed at the side of said slides and urged into forced engagement with said engagement holes.

37. The collapsible baby carriage of claim 36, further including levers having said engagement projections at their front ends, and spring means for urging said levers to cause said forced engagement.

38. The collapsible baby carriage of claim 1, further including a basket for holding baggage therein, said basket being attached between said auxiliary rods.

39. The collapsible baby carriage of claim 38, wherein said basket comprises frame members interconnected in a framework pivoting manner in X-wise crossing pairs, said frame members defining a first surface extending along a surface crossing on one auxiliary rod a plane defined by said one auxiliary rod and the other auxiliary rod, a second surface spaced apart from said opposed to said first surface and crossing on said other auxiliary rod the plane defined by said one auxiliary rod and the other auxiliary rod, and a third surface spaced apart from and opposed to the plane defined by said one auxiliary rod and the other auxiliary rod, link means (119, 120, 121, 122 and 112, 114, 116, 118) connecting corners of said first and second surface to said third surface and to said auxiliary rods in such a manner that said basket framework may be collapsed in response to the collapsing of said baby carriage.

40. The collapsible baby carriage of claim 39, further including a bag supported by said frame members and disposed in a space surrounded by said frame members, said bag being formed of a foldable sheet.

41. The collapsible baby carriage of claim 40, wherein said bag is formed of a mesh type material.

42. The collapsible baby carriage of claim 40, wherein said bag is formed of a fabric.

43. The collapsible baby carriage of claim 15, further including fixed links supporting opposite sides of said seat and secured to said main rods, first movable links including first hinges extending from said fixed links for supporting opposite sides of said back, second movable links including second hinges extending from said fixed links in a direction opposite to said first movable links for supporting opposite sides of said footrest, rigid intervening links which connect said first and second movable links, said first and second hinges being disposed on the same side of said intervening links, whereby said first and second movable links are interlocked to be rotated in the same direction, and means for rotating and substantially fixing said first or second movable links in a certain tilted state relative to said main rods, whereby the angle of inclination of said back relative to said seat and the position of said footrest are adjustable.

44. The collapsible baby carriage of claim 43, further comprising a slide member slidably secured to said first or second movable links, and a rigid link which connects said slide member and said main rod to each other, whereby the sliding and fixing of said slide member cause the rotation and fixing of said first or second movable links.

45. The collapsible baby carriage of claim 44, further including a plurality of engagement holes distributed lengthwise of said first or second movable links, and an engagement projection provided on said slide member and urged into a forced engagement with said engagement hole.

46. The collapsible baby carriage of claim 45, further including a lever having said engagement projection at its front end, and a spring urging said lever to cause said forced engagement.

47. The collapsible baby carriage of claim 43, wherein said means for rotating and substantially fixing said first or second movable links selectively fixes the rotary motion of said first or second hinges, whereby the rotation and fixing of said first or second movable links is dependent upon the fixed and non-fixed state of said hinge.

48. The collapsible baby carriage of claim 43, wherein said first movable links, said fixed links and said second movable links are connected in series to form a respective single bar.

* * * * *

UNITED STATES PATENT AND TRADEMARK OFFICE
CERTIFICATE OF CORRECTION

PATENT NO. : 4,272,100
DATED : June 9, 1981
INVENTOR(S) : Kenzou Kassai

It is certified that error appears in the above—identified patent and that said Letters Patent is hereby corrected as shown below:

Claim 17, line 2, before "means" --hinge-- should be inserted.
Claim 21, line 3, "particle" should read --partial--.
Claim 29, line 2, "receptable" should read --receptacle--.
Claim 39, line 7, "said" should read --and--.

Signed and Sealed this

Fourth Day of May 1982

[SEAL]

Attest:

Attesting Officer

GERALD J. MOSSINGHOFF
Commissioner of Patents and Trademarks